United States Patent [19]
Greskovich et al.

[11] Patent Number: 5,013,696
[45] Date of Patent: May 7, 1991

[54] PREPARATION OF HIGH UNIFORMITY POLYCRYSTALLINE CERAMICS BY PRESINTERING, HOT ISOSTATIC PRESSING AND SINTERING AND THE RESULTING CERAMIC

[75] Inventors: Charles D. Greskovich; William P. Minnear, both of Schenectady; Milivoj K. Brun, Ballston Lake, all of N.Y.; Robert J. Riedner, Waukesha, Wis.

[73] Assignee: General Electric Company, Schenectady, N.Y.

[21] Appl. No.: 412,237

[22] Filed: Sep. 25, 1989

[51] Int. Cl.$^5$ ............................................. C04B 35/10
[52] U.S. Cl. ................................. 501/153; 501/152; 264/66
[58] Field of Search .......................... 501/153; 264/66

[56] References Cited

U.S. PATENT DOCUMENTS

| | | | |
|---|---|---|---|
| 3,026,177 | 3/1962 | St. Pierre et al. | 23/142 |
| 4,150,317 | 4/1979 | I aska et al. | 313/221 |
| 4,166,831 | 9/1977 | Rhodes et al. | 264/1 |
| 4,211,758 | 7/1980 | Buhrer | 423/263 |
| 4,418,024 | 11/1983 | Prochazka et al. | 264/1.2 |
| 4,418,025 | 11/1983 | Prochazka et al. | 204/1.2 |
| 4,427,785 | 1/1984 | Prochazka et al. | 501/128 |
| 4,518,546 | 5/1985 | Greskovich et al. | 254/1.2 |
| 4,543,346 | 9/1985 | Matsui et al. | 501/120 |
| 4,761,390 | 8/1988 | Hartnett et al. | 501/152 |
| 4,762,655 | 8/1988 | Rhodes et al. | 264/65 |
| 4,797,238 | 1/1989 | Rhodes et al. | 264/65 |

Primary Examiner—William R. Dixon, Jr.
Assistant Examiner—Alan A. Wright
Attorney, Agent, or Firm—Robert Ochis; James C. Davis, Jr.; Marvin Snyder

[57] ABSTRACT

Polycrystalline ceramic bodies having uniform transparent optical characteristics are produced by providing a green compact, presintering that compact at a temperature in the range from about 1,350° C. to about 1,650° C. until the closed porosity stage is reached, hot isostatic pressing the presintered compact to collapse substantially all pores disposed at grain boundaries and resintering the hot isostatically pressed compact at a temperature in the range from 1,700° C.–1,950° C. to cause grain growth under conditions in which pores, within those grains which are consumed by the growth of other grains, collapse as the grain boundary of the growing grain passes through the location of the pore in the smaller grain being consumed.

39 Claims, 5 Drawing Sheets

PREPARATION OF HIGH UNIFORMITY POLYCRYSTALLINE CERAMICS BY PRESINTERING, HOT ISOSTATIC PRESSING AND SINTERING AND THE RESULTING CERAMIC

BACKGROUND OF THE INVENTION

1. Field of the Invention

The present invention relates to the field of preparation of uniform ceramics, and more particularly, to the preparation of low residual porosity.

2. Background Information

Polycrystalline ceramics today are being considered for an increasing variety of applications. Many sophisticated applications require ceramics having very uniform composition and properties throughout the ceramic body. One characteristic which is normally non-uniform in ceramics is the porosity or the spatial distribution of pores. In this sense, for high density ceramics (>98% of theoretical maximum density) porosity refers to the presence of closed pores or voids within the ceramic and not to the presence of a connected pattern of open pores as is present in a "porous" body. This distinction is well understood in the ceramics art. The non-uniform porosity which is present in polycrystalline ceramics generally involves the presence of pore clusters in which a large number of pores are disposed within a small volume of the ceramic which is surrounded by material having a substantially smaller number density of pores.

These pore clusters render the ceramic non-uniform in mechanical properties and in the case of potentially transparent ceramics, also renders them optically non-uniform.

U.S. Pat. No. 4,518,546 entitled "Preparation of Yttria-Gadolinia Ceramic Scintillators by Sintering and Gas Hot Isostatic Pressing" by C. D. Greskovich et al. discloses a method for preparing substantially transparent yttria-gadolinia ($Y_2O_3/Gd_2O_3$) ceramic scintillators which include other oxides such as europium oxide ($Eu_2O_3$), neodymium oxide ($Nd_2O_3$), ytterbium oxide ($Yb_2O_3$), dysprosium oxide ($Dy_2O_3$), praseodymium oxide ($Pr_2O_3$) and terbium oxide ($Tb_2O_3$) as activators for scintillation. This patent is incorporated herein by reference. These ceramic scintillators are optically quite uniform on a macroscopic scale. The optical uniformity of these bodies also indicates that their mechanical properties are also substantially uniform on a macroscopic scale. While these bodies are optically quite uniform, they still have substantial non-uniformities on a microscopic scale as will be discussed subsequently.

In the process of U.S. Pat. No. 4,518,546, a compact of the desired source oxides is cold pressed at pressures of 3,000 psi to 15,000 psi or higher in order to provide a green compact having a relatively high density. This compact is then heated in a vacuum or a reducing atmosphere such as wet hydrogen (dew point about 23° C.), for example, to a sintering temperature between 1,800° C. and 2,100° C. The sintering temperature is maintained for about 1 hour to about 30 hours to cause extensive densification and produce optical transparency.

The resulting ceramic body is transparent with an in-line optical attenuation coefficient of up to 50 cm$^{-1}$ at the main emitting wavelength for the scintillator composition. Unfortunately, while the resulting ceramic body is transparent, its optical characteristics are not uniform and it suffers from the presence of clusters of pores in which the clusters are 50 to 300 or 400 microns across or in "diameter". These clusters of pores, which we refer to as "snowballs", are highly dispersive of incident light and result in a non-uniform optical characteristics for the ceramic body as a whole. These snowballs are much more visible in transmitted light than in reflected light. While there are many applications in which the presence of these snowballs does not interfere with the usefulness of the ceramic body, there are other applications in which the presence of snowballs is highly detrimental. One such application is the ceramic scintillator art where the presence of snowballs interferes with uniform extraction of luminescent light generated by incident x-rays or other source energy. Non-uniform collection of the luminescent light adversely affects the resulting image quality of computed tomography body scanners in which these ceramic scintillators are employed for the medical industry. Consequently, these ceramic bodies, when sliced to provide smaller ceramic bodies which are used as scintillators, produce some smaller bodies having acceptable characteristics and other smaller bodies in which snowballs cause rejection as not meeting specifications. Every ceramic plate which we have made using the sinter-only techniques disclosed in U.S. Pat. No. 4,518,546 has had a number of pore clusters in every cubic millimeter of its volume. The number of pore clusters per 1 mm$^3$ ranges from at least 5 to a large number. The degree to which the pore clusters interfere with light transmission varies with the number, size and position of the pore clusters in the polycrystalline ceramic.

The individual pores of which a cluster of pores or snowball is formed are micron-to-submicron sized voids within grains of the polycrystalline ceramic structure. It is well known in the ceramics art that once a pore is located within the bulk of a grain of the ceramic, that pore is permanently trapped in that location. While it is theoretically possible for diffusion to transport material through the bulk of the crystal grain to fill the void and thereby collapse the pore, it is well known in the ceramics art, that as a practical matter, such transport is not effective for collapsing enough pores to remove a pore cluster. There is no known sintering process that can produce a highly transparent polycrystalline ceramic body having an optical attenuation coefficients in the visible region below about 10 cm$^{-1}$ and which is free of pore clusters.

An alternative preparation technique involves sintering the compact at a temperature between about 1,500° C. and 1,700° C. for between 1 and 10 hours and at least until a closed pore stage is reached. Thereafter, the sintered compact is hot isostatic pressed with an inert gas, such as argon gas, for example, at pressures between 1,000 psi and 30,000 psi at temperatures between about 1,500° C. and 1,800° C. for between one-half and 2 hours. These plates are translucent due to a high density of fine (micron to submicrons) pores and have an inline transmission of about 2% in the visible region for a 1 mm thick specimen.

These plates also suffer from discoloration and composition changes at the surfaces of the ceramic body as a result of the processing steps. The color changes can, to some extent, be compensated by further processing as is explained in U.S. Pat. No. 4,518,546 by annealing the ceramic body in air at about 800° C. to 1,200° C. for between 1 and 20 hours. However, the compositional non-uniformities are not corrected by such annealing. Such uncorrected compositional non-uniformities can be a serious flaw which results in nonuniform luminescence. A number of variations on these processes are discussed in the above-identified patent. A processing method in which the ceramic sample does not suffer from discoloration or compositional changes during the process is desirable.

There is a need for ceramics having uniform properties, such as transparent polycrystalline ceramics which are free of pore clusters for use in systems which require uniform, high optical quality, polycrystalline ceramic materials. There is also a need for a method of reliably producing such ceramic bodies.

OBJECTS OF THE INVENTION

Accordingly, a primary object of the present invention is to provide a method of producing polycrystalline ceramics having an optical attenuation coefficient for inline spectral transmittance below about 20 cm$^{-1}$ in the visible wavelength region and which are free of visible pore clusters.

A further object of the present invention is to provide a transparent polycrystalline ceramic material having an optical attenuation coefficient below 10 cm$^{-1}$ whiCh is free of pore clusters which are larger than 25-50 microns across or in "diameter".

Another object of the present invention is to provide a method of collapsing pores which are situated within a grain of a polycrystalline ceramic material.

SUMMARY OF THE INVENTION

The above and other objects of the invention which will become apparent from the specification as a whole are accomplished in accordance with the present invention by presintering a green ceramic compact until the closed pore stage is reached under conditions which produce a fine grain structure, hot isostatic pressing the resulting presintered body to collapse substantially all pores which are disposed at grain boundaries, and resintering the hot isostatically pressed body at a high enough temperature that grain growth takes place under conditions in which grain boundaries migrate through existing grains at a slow enough rate that pores, disposed inside grains through which the grain boundary migrates during grain growth, collapse or disappear during the process of incorporating the material of the consumed grain into the crystal structure of the growing grain to thereby provide a ceramic body having a substantially reduced pore number density as compared to the same body at the end of the hot isostatic pressing step.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIGS. 1-5 are photomicrographs of ceramic structures.

DETAILED DESCRIPTION

Figure 1:
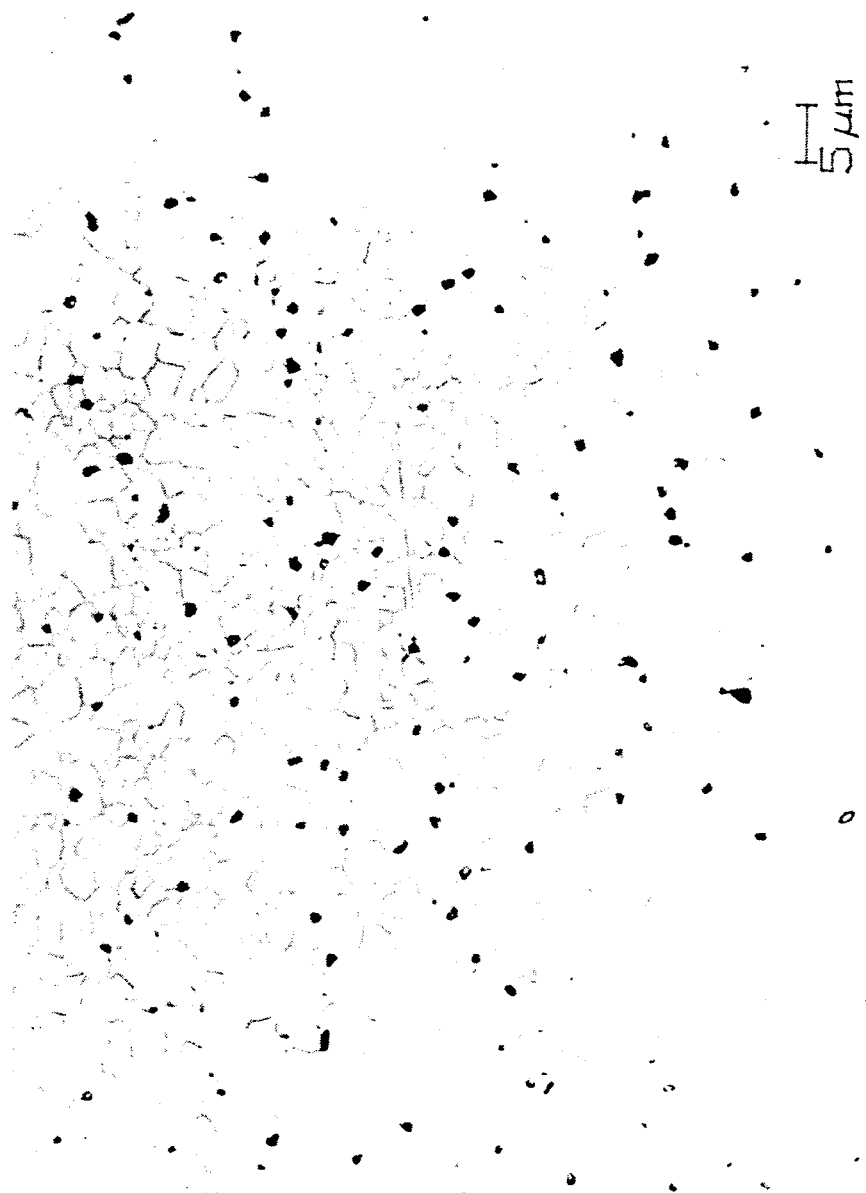

In accordance with the present invention, a green ceramic compact may be prepared in the manner taught in U.S. Pat. No. 4,518,546, or by wet slip casting or filter casting or by other techniques as may be considered desirable. Wet casting of the green compact appears to be a viable process for forming the compact for presintering and has the typical advantage of producing a more dense compact than is produced from the pressing of dry powders. In accordance with the present invention, these green ceramic compacts are presintered at a temperature in the range from about 1,350° C. to about 1,600° C. in either a dry hydrogen atmosphere (dew point about −50° C.) or a wet hydrogen atmosphere (dew point about +23° C.) for a period of about one-half to 10 hours. The resulting presintered bodies are opaque as a result of their high pore density, but are at a closed pore stage.

These closed pore samples were then loaded in a molybdenum crucible and embedded in high purity powders of any one of $Y_2O_3$, $Gd_2O_3$ or the same composition as the ceramic body itself. These samples were packed in high purity powder to protect them from the ambient environment in the gas hot isostatic press (furnace) because that furnace is not a dedicated furnace and what impurities might be present in the furnace was unknown. That loaded crucible was placed in a gas hot isostatic press and heated at rates of about 10-50° C. per minute up to temperatures between 1,350° C. and 1,700° C. for one-half to 2 hours in argon gas at pressures between 5,000 and 25,000 psi. Higher or lower pressures may be used. A preferred temperature range for this hot isostatic pressing step is between 1,400° C. and 1,550° C. However, both higher and lower temperatures are effective. Following the hot isostatic pressing, the resulting plates had a normal, uniform color and microstructure. We refer to these plates as SHIP plates for Sintered, Hot, Isostatically Pressed plates. At the end of the hot isostatic pressing step, the ceramic plates have a very small grain size in the range from 2-4 microns because of the low sintering temperature used in the presintering step. The resulting plates, when polished, are only translucent or marginally transparent and contain a moderately high density of submicron pores.

These polished SHIP plates were only marginally transparent with optical attenuation coefficients typically greater than 20 cm$^{-1}$ in the visible region of the electromagnetic spectrum. This optical attenuation coefficient was measured by using a pencil beam of light focused on a photodetector and measuring the light incident on that photodetector by the electronic output from the photodetector and then inserting a polish plate sample in the beam path from the light source to the photodetector and measuring the change in light incident on the light detector. In this geometry, the polished plate is oriented perpendicular to the light beam with its shortest dimension parallel to the beam. The resulting measured light intensity is less than that in the absence of the sample through a number of separate contributions from the sample. First, incident light striking the sample is partially reflected. Second, light which is absorbed within the sample does not reach the photodetector. Third, light which is scattered within the sample does not reach the photodetector and fourth, light which reaches the exit face of the sample is partially reflected.

The poor optical quality of these SHIP plates was caused by the presence of a high number density of 0.3-0.8 micron-sized pores that cause substantial light scattering and thus loss from the beam.

Microstructural analysis revealed that these pores were permanent fixtures in the ceramic structure, since they were within the bulk of individual grains of the polycrystalline material, and as has been discussed above, it is well known in the ceramics art that once a pore is enclosed within a grain, it is essentially a permanent or residual fixture of the ceramic body. However, we have found that the number density of these fine pores can be markedly reduced by resintering the sample to induce grain growth. This is preferably done at temperatures higher than the temperatures used during the presintering and the hot isostatic pressing. Typically, the SHIP plates were loaded into a tungsten-resistance furnace and heated in wet hydrogen gas at a rate of 350° C. per hour to a resintering temperature between about 1,700° C. and 1,950° C. for a period from 1–10 hours. During the heat-up period, the temperature may be maintained in the range from 1,600–1,700° C. for from 1–20 hours or more, as may be desired. At the end of this resintering step, the plates had uniform, high optical quality. We refer to these plates as SHIPS plates for Sintered, Hot Isostatically Pressed and Sintered plates. For clarity of description in this specification, the first sintering step is referred to as "pre-sintering" and the second sintering step is referred to as "resintering". We attribute the resulting high optical quality to a phenomenon which is not present in normal sintering where the high temperature at which normal sintering is performed combines with the relatively low density of the green compact being sintered to trap many pores within the fast growing grains. In our SHIPS process, substantially all of the pores located on grain boundaries at the end of the presintering step, are collapsed during the hot isostatic pressing step. During normal sintering, many of these pores do not collapse since grain growth is fast enough that many pores become entrapped within grains. Consequently, the remaining pores are present within the grains of the polycrystalline ceramic. Polycrystalline ceramics which have been normally sintered at high temperatures (1,700° C.–1,950° C.), typically have grain sizes in the range from about 10 to about 200 microns. In contrast, our SHIP plates have a grain size typically in the range from about 2 to about 4 microns. During resintering of our SHIP plates at a temperature in the range from about 1,700° C. to about 1,950° C., the larger grains in the fine grain structure of those SHIP plates grow at the expense of adjacent smaller (sacrificial or consumed) grains. As part of this growth process, the grain boundary of a large growing grain migrates through the individual small grains adjacent to the growing grain as the material of the small grain is incorporated into the crystal structure of the growing grain. The rate at which this grain boundary migrates through the sacrificial or consumed grains is small enough that most of the occluded pores disappear during grain growth. This may be the result of material transport along that grain boundary which is able to fill in and collapse the majority of the small pores which were present in the SHIP plate. In this manner, the grain growth during this resintering step collapses most or all of the pores residing inside grains through which the grain boundary of the growing grain migrates as the grain is consumed. The theoretical limit on this elimination of pores is that those pores which were originally located (at the end of the hot isostatic pressing step) in the large grains which grew during the resintering step are the only ones which cannot be eliminated during this resintering step. Thus, if pores were evenly distributed at the end of the hot isostatic pressing, then at the end of the resintering step, the ratio of the number of remaining pores to the number present at the end of the hot isostatic pressing stage would be the same as the ratio of the average grain volume at the end of hot isostatic pressing step to the average grain volume at the end of the resintering step, a ratio of $$\frac{\pi D^3_{SHIP}}{6} \text{ to } \frac{\pi D^3_{SHIPS}}{6} \rightarrow \left(\frac{D^3_{SHIP}}{D^3_{SHIPS}}\right)$$

or about $$\left(\frac{2}{10} \text{ to } \frac{4}{200}\right)^3 \text{ or } \left(\frac{1}{5} \text{ to } \frac{1}{50}\right)^3 \text{ or } \frac{1}{125} \text{ to } \frac{1}{125,000}$$

for a reduction in pore number by a factor between about 125 and 125,000 and probably about 1,000 typically where the final grain size is about 30 microns at the end of the resintering step. It will be recognized that there is a trade off between pore reduction by grain growth and final grain size. Ceramic scintillator plates must be sliced into smaller pieces where high resolution is required in a multicell scintillator detecting system. The mechanical and optical qualities of the resulting smaller pieces depend on the grain size in the final resintered plate because larger grain sizes can result in chipping of the surfaces of smaller pieces during the slicing of the main plate. Consequently, the final grain size desired depends on the requirements for optical clarity and uniformity.

If the grain boundary migration rate is kept small enough during resintering, all pores present in the consumed grains are collapsed during the resintering step. Consequently, only pores which were present at the end of the hot isostatic pressing step within the grains which are not consumed, i.e. the grains which grow, are preserved in the final resintered structure. The final resintered structure is substantially free of pore clusters, is substantially more dense than the same body at the end of the hot isostatic pressing step and has a total pore volume which is substantially less than the pore volume at the end of the hot isostatic pressing step. All of these considerations lead us to conclude that the majority of pores actually collapse as the boundary of the growing grain migrates past them rather than the number density of pores decreasing primarily because of small pores coalescing to form larger pores. At the end of this resintering step, the grain size is in the 10–200 micron range, the pore sizes range from about 0.5 to about 1.5 microns and any clusters of pores are smaller than 10 microns.

We have found that in fine grain (less than 5–10 micron grain size) ceramics, in which there are few pores on grain boundaries, a substantial number of pores entrapped in grains can be eliminated by causing grain growth. The resulting reduction in the number density of pores is believed to be a result of two processes. The first one being pore elimination or collapse due to material transport along the grain boundary of the growing grain and the other being coalescence of two or more pores to form a single larger pore.

It is our belief that in the normal sintering-only process at high temperature, the density of the green compact is low enough and the grain boundaries move fast enough, that there is not enough time to transport enough material to fill-in all the voids in the compact before the grain boundary has passed by a given void, thereby enclosing it in a grain as a permanent pore. In contrast, during our resintering step, the density of the ceramic is much higher, the pores are of small size and relatively widely spaced from each other, with the result that the small amount of material transport which is necessary to collapse one of these small pores easily takes place along the grain boundary even though that boundary may be propagating or moving at substantially the same rate at which grain boundaries move in the sintering only process. The result is a final sintered body in which the number density of pores and pore clusters are very low with the result that there is no significant pore interference with light transmission.

EXAMPLE 1

A particular composition which was used to form a number of ceramic plates in accordance with the present invention consisted of approximately 8 grams of powder of a composition which was 67 mole percent $Y_2O_3$, 30 mole percent $Gd_2O_3$, 3 mole percent $Eu_2O_3$ and 150 ppm $Pr_2O_3$. This powder composition was cold pressed in a rectangular die at about 7,000 psi. The samples were isostatically pressed at 50,000 psi using wet bag isostatic pressing in which the sample is enclosed in a bag and liquid pressure is applied to provide the pressing pressure. The resulting samples had a green density of about 55% of the theoretical maximum density for the material.

A series of samples from two batches of the same composition were presintered for 4 hours in dry hydrogen and 1 hour in wet hydrogen at 1,625° C. The relative densities following this presintering step ranged from about 97% to about 99% of the theoretical maximum density and the closed porosity stage was reached. FIG. 1 is photomicrograph of a section of such a plate. That section was polished and then chemically etched to reveal the grain structure, including pore locations. This photomicrograph was taken in reflected light. The black spots are pores. The large pores are almost exclusively present at grain boundaries. There are also a number of smaller pores within grains which generally appear dark gray rather than black.

Figure 2:
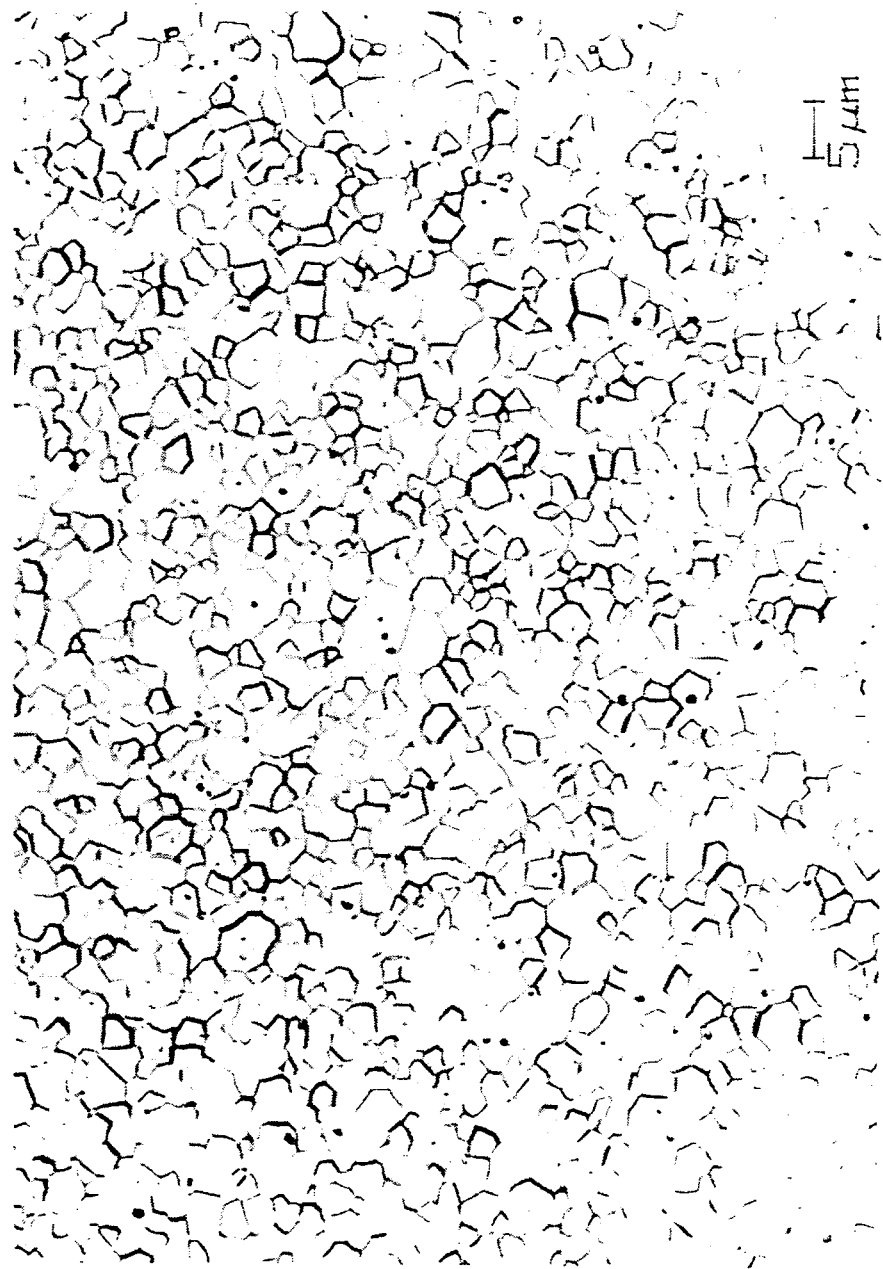

The samples were then hot isostatically pressed for 1 hour at 1,650° C. in 25,000 psi of argon gas. FIG. 2 is a photomicrograph of a section of a plate after the hot isostatic pressing step. The section was prepared and photographed in the same manner as the FIG. 1 sample. The scale on FIGS. 1 and 2 is the same. It will be noted that the number density of pores is much less in FIG. 2 than in FIG. 1, most of the pores are situated inside grains and very few pores are situated on grain boundaries.

Figure 3:
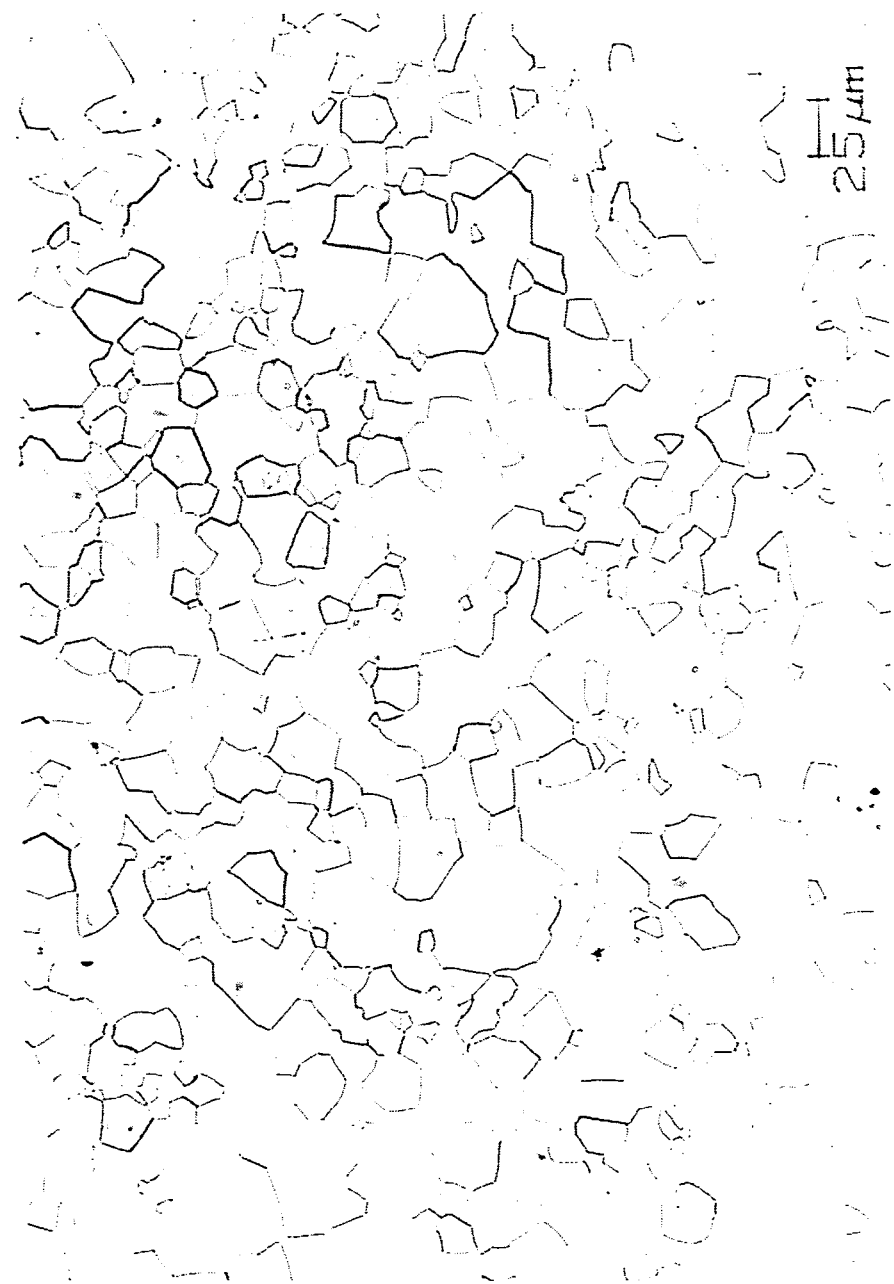

The samples were then resintered. FIG. 3 is photomicrograph of a section of the plate after the resintering step. This sample was prepared and photographed in the same manner as the FIG. 1 and FIG. 2 samples, however, with a different magnification. The difference in scale in FIG. 3 as compared to FIGS. 1 and 2 should be noted as should the much larger grain size and the almost total absence of pores.

The FIG. 3 sample is transparent, having an inline transmission of about 70% in the visible portion of the spectrum whereas the FIG. 1 and FIG. 2 samples are translucent with inline transmissions typically about 2% in the visible region. Because of the high transparency of the FIG. 3 sample, surface artifacts such as stains from chemical etching, are more prominent in FIG. 3 than in FIGS. 1 and 2. The cluster of dark spots near the lower edge of the FIG. 3 photo to the left of center are such artifacts rather than pores and some other pronounced stains are evident at about 11:00 from that set of artifacts and a third of the way up the figure. Thus, the FIG. 3 sample is of even higher quality than it would initially appear to be to those not skilled in the art of microstructure interpretation.

Samples which were prepared by our SHIPS process as set forth in Example 1, were polished and measured for spectral transmittance in the visible region of the electromagnetic spectrum at wavelengths from ~300 to 800 nm.

EXAMPLE 1A

The average measured spectral transmittance for 1 mm thick, polished plates from the two different batches of a material of identical composition on which the resintering step was performed at 1,850° C. for 2 hours in wet hydrogen was 60.5 ±3% at the incident wavelength of 600 nm.

EXAMPLE 1B

A second set of these samples in which the resintering was done at a temperature of 1,925° C. in wet hydrogen for 2 hours, had an average measured spectral transmittance of about 79% which is very close to the theoretical maximum transmittance of 81.1%. Further, for each of these bodies, the transmittance was uniform within 1% across the body. There are a number of applications, such as solid state x-ray detectors in CT scanners, where transmission uniformity is more important than maximizing light transmittance. These samples (especially those of Example 1B) satisfy both of these needs.

The reason that this theoretical transmittance of 81.1% is not 100% is because of reflection losses at the entry and exit faces of the sample. The corresponding optical attenuation coefficients for the samples with 60.5% and 79% spectral transmittance at a wavelength of 600 nm were 2.93 cm$^{-1}$ and 0.26 cm$^{-1}$, respectively. In these samples, the pore size at the end of the resintering step was typically in the range from one-half to 2 microns, but as is discussed above, the number density of pores was greatly reduced and any clusters of pores were smaller than 10 microns. The average grain size was typically 25 microns for 1,850° C. resintering and 125 microns for 1,925° C. resintering.

Figure 4:
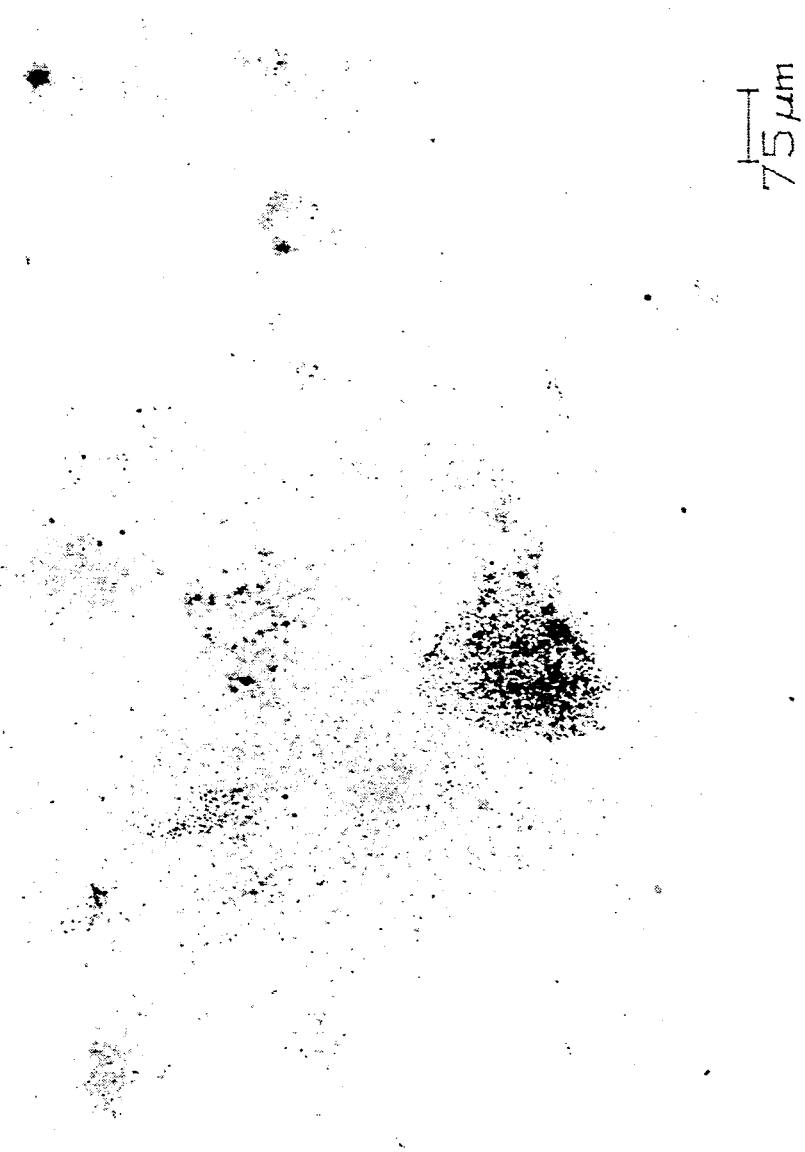

FIG. 4 is a photomicrograph taken by transmitted light of a polished ceramic body made by the sinter only process disclosed in U.S. Pat. No. 4,518,546. A number of pore clusters are visible in this photograph with the most prominent one being near the center just below the midline of the photograph. The other pore clusters are less distinct in the photograph because they do not lie in the focal plane of the optical system.

FIG. 5 is a photomicrograph of a SHIPS plate taken in transmitted light showing the essentially total absence of pore clusters and the extensive uniformity of the ceramic body. The magnifications in FIGS. 4 and 5 are the same. A comparison of FIGS. 4 and 5 provides a striking demonstration of the increase in microstructural uniformity and quality provided by our SHIPS process.

These resulting plates make excellent scintillators for the conversion of incident x-rays to visible light which is detectable by a photodiode or other appropriate photosensor. Such scintillators may be made in accordance with the present invention in which the basic composition contains both yttria and gadolinia with one or more of the activator materials europium oxide ($Eu_2O_3$), neodymium oxide ($Nd_2O_3$), ytterbium oxide ($Yb_2O_3$), dysprosium oxide ($Dy_2O_3$), praseodymium oxide ($Pr_2O_3$) and terbium oxide ($Tb_2O_3$). In addition, if desired, other materials may be incorporated in the mixture.

While the specific examples above are with respect to the yttria-gadolinia material, this process is also effective with other materials and is of general applicability in the ceramic art and is not limited to the particular materials in question.

EXAMPLE 2

This process was used to prepare translucent alumina ($Al_2O_3$) ceramic plates. Alumina powder of 99.99% purity and containing 0.1 wt% magnesia as a sintering aid was isostatically pressed to form a green tubular compact which was about 50% of theoretical maximum density. This compact was presintered at 1,500° C. for 1 hour, hot isostatic pressed in argon at 25,000 psi for 0.5 hours at 1,550° C. and resintered at 1,850° C. for 2 hours. This body was more than 99.9% of its theoretical maximum density of 3.986 g/cm$^3$. Our method of measuring density (Archimedes' immersion method) does not distinguish among densities greater than 99.9% of the theoretical density. At the end of the presintering step, this material had a grain size of about 1.3 microns and a density of 98.1 % of theoretical maximum. After the hot isostatic pressing, the density increased to at least 99.9% of theoretical maximum. After the resintering step, the grain size had increased to 28 microns and the density had also increased. This sample contained a number of pore clusters, each of which was less than 12 microns in diameter. These small pore clusters should be eliminated by modification of the compact preparation and presintering steps to reduce the entrapment of pores within the grains during the presintering step. Typical prior art sintered-only samples in which the green compact was prepared in the same way and then sintered at 1,850° C. for 2 hours also have a final density of more than 99.9% of theoretical limit. However, these prior art samples typically have a substantial density of pore clusters which are between 50 and 75 microns in diameter.

As compared to high optical quality prior art alumina samples which have optical attenuation coefficients ranging from about 20 cm$^{-1}$ down to a minimum of about 15 cm$^{-1}$ in the yellow portion of the visible spectrum, these samples in accordance with the present invention have substantially improved optical quality, a lower optical attenuation coefficient and a substantially reduced number density of pores. Thus, these SHIPS samples have optical attenuation coefficients of less than 15 cm$^{-1}$. This establishes that the SHIPS process improves the uniformity of the microstructure in anisotropic crystal structure ceramics and in isotropic crystal structure ceramics, since aluminum oxide belongs to a hexagonal crystal system whereas the yttrium oxide/gadolinium oxide material belongs to a cubic symmetry crystal system.

Thus, this process is of general applicability to ceramic preparation, whether of optical materials or not and independent of the crystal structure of the material. As a consequence of these tests, it is clear that this method of presintering the ceramic material at a low temperature in a manner which results in a fine grain structure and closed porosity followed by hot isostatic pressing to collapse substantially all the pores which are located on grain boundaries followed by resintering to cause grain growth substantially eliminates pores initially contained within the body of small grains which are consumed by the growth of larger grains.

This entire SHIPS process can be done as a single continuous process, provided appropriate apparatus is used. That is, the presintering can be done in a hot isostatic press at atmospheric pressure until the closed pore stage has been reached. Then the hydrogen atmosphere is replaced by argon gas and the press pressurized to the desired hot isostatic pressing pressure to collapse the pores on grain boundaries. At the end of the hot isostatic pressing period, the temperature can be increased to the resintering temperature after reducing or releasing the pressure. Continued application of the pressure during the resintering may aid in collapsing pores by providing an external pressure which aids in pore shrinkage via material transport along grain boundaries.

This continuous process provides substantial savings in time by (1) eliminating the cooling periods after the presintering and hot isostatic pressing steps and (2) eliminating the heating steps in preparation for the hot isostatic pressing step and the resintering step. This single continuous process also provides substantial energy savings by avoiding the need to heat the ceramic from room temperature prior to hot isostatic pressing and prior to resintering. Thus, substantial savings in time and energy use and thus recurring costs, are obtained through use of this process.

The provision of uniform properties is important in a number of areas. First a body which is statistically uniform, has uniform mechanical, optical, magnetic, etc. properties. Second, this statistical uniformity also provides production repeatability in a commercial scale of preparation such that the resulting material is commercially producible rather than merely a laboratory curiosity which cannot be applied to commercial products because of an inability to produce it in large quantities.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method of producing a ceramic body comprising:
   providing a green compact of appropriate configuration and composition;
   presintering said compact at a temperature sufficient to promote grain growth to a substantially closed pore stage;
   hot isostatic pressing said presintered compact at a temperature and pressure sufficient to eliminate most pores which are located at grain boundaries; and
   resintering said body to induce further grain growth and further densification by reducing the number density of pores by a factor of at least 125.

2. The method recited in claim 1 wherein:
   said resintering step is carried out at a higher temperature than said hot isostatic pressing step.

3. The method recited in claim 1 wherein:

after said presintering step said body has an average grain size of less than 10 microns.

4. The method recited in claim 3 wherein:
after said presintering step said body has an average grain size of between 10 microns and 200 microns.

5. The method recited in claim 3 wherein:
after said resintering step, said body has an average grain size of between 10 microns and 50 microns.

6. A method of making a high density ceramic with low residual porosity comprising:
providing a green ceramic body;
pre-sintering said green ceramic body until the body reaches the closed pore stage, under conditions in which a fine grain structure is produced;
hot isostatic pressing said pre-sintered body for a period of time and at a temperature sufficient to eliminate substantially all pores disposed at grain boundaries; and
sintering said hot isostatically pressed body at a temperature at which further densification and grain growth take place under conditions in which grain boundary migration is slow enough to permit pore disappearance for substantially all pores past which a grain boundary migrates.

7. The method recited in claim 6 wherein said ceramic has a cubic crystal structure.

8. The method recited in claim 7 wherein said ceramic comprises yttrium oxide.

9. The method recited in claim 8 wherein said ceramic comprises gadolinium oxide.

10. The method recited in claim 8 wherein:
said pre-sintering step is carried out in the temperature range between about 1,350° C. and about 1,600° C.;
said hot isostatic pressing step is carried out at substantially the same temperature as said pre-sintering step; and
said resintering step is carried out at a temperature in excess of 1,650° C.

11. The method recited in claim 6 wherein:
said pre-sintering step is performed at a temperature in the range from 1,600° C. to 1,650° C.

12. The method recited in claim 11 wherein:
said hot isostatic pressing step is performed at a temperature in the range between 1,500° C. and 1,550° C. at a pressure in excess of 5,000 psi.

13. The method recited in claim 12 wherein said resintering step is performed at a temperature between about 1,700° C. and 1,950° C.

14. The method recited in claim 6 wherein said presintering step is carried out at a temperature of substantially 1,625° C. for about 4 hours in dry hydrogen followed by about 1 hour in wet hydrogen;
said hot isostatic pressing is carried out at a temperature of about 1,650° C. at a pressure of about 25,000 psi or more; and
said resintering step is carried out at a temperature of at least 1,850° C. for a period of about 2

15. The method recited in claim 14 wherein:
said resintering step is carried out at a temperature of about 1,925° C.

16. The method recited in claim 6 wherein:
said ceramic has a hexagonal crystal structure.

17. The method recited in claim 16 wherein:
said ceramic comprises aluminum oxide.

18. A polycrystalline ceramic body:
having a volume of at least 1 mm$^3$;
having an optical attenuation coefficient of less than 10 cm$^{-1}$, at a measurement frequency in the visible region of the electromagnetic spectrum whereby said body is transparent; and
being free of pore clusters larger than 10 microns across.

19. The ceramic body recited in claim 18 wherein:
said body consists of material having a cubic crystal structure.

20. The ceramic body recited in claim 19 wherein:
said body comprises yttrium oxide.

21. The ceramic body recited in claim 20 wherein:
said body comprises gadolinium oxide.

22. The ceramic body recited in claim 18 wherein:
said body comprises gadolinium oxide.

23. The ceramic body recited in claim 18 exhibiting an optical attenuation coefficient which, at a fixed measurement frequency in the visible region of the electromagnetic spectrum, is uniform throughout said body to within 10%.

24. The ceramic body recited in claim 18 wherein:
said optical attenuation coefficient is less than 3 cm$^{-1}$.

25. The ceramic body recited in claim 18 wherein:
said ceramic is substantially 67 mole percent $Y_2O_3$, 30 mole percent $Gd_2O_3$, 3 mole percent $Eu_2O_3$ and 150 ppm $Pr_2O_3$.

26. The ceramic body recited in claim 25 wherein:
said body has less than one pore cluster per cm$^3$.

27. The ceramic body recited in claim 18 exhibiting an optical attenuation coefficient which, at a fixed measurement frequency in the visible region of the electromagnetic spectrum, is uniform throughout said body within 1%.

28. A polycrystalline ceramic body:
exhibiting an optical attenuation coefficient which, at a fixed measurement frequency in the visible region of the electromagnetic spectrum, is uniform throughout said body to within 3% and less than 10 cm$^{-1}$.

29. The ceramic body recited in claim 28 having:
an average grain size of less than 10 microns.

30. The ceramic body recited in claim 28 having:
an average grain size between 10 microns and 200 microns.

31. The ceramic body recited in claim 28 having:
an average grain size of between 10 microns and 50 microns.

32. A polycrystalline ceramic body:
having a non-cubic crystal structure;
having a volume of at least 1 mm$^3$;
having an optical attenuation coefficient of less than 15 cm$^{-1}$, at a measurement frequency in the visible region of the electromagnetic spectrum; and
being free of pore clusters larger than 12 microns across.

33. The ceramic body recited in claim 32 wherein said body comprises alumina.

34. The method recited in claim 1 wherein:
said composition is single phased throughout the presintering, hot isostatic pressing and resintering steps.

35. The method recited in claim 1 wherein:
the presintering, hot isostatic pressing and resintering steps are all carried out at temperatures at which no liquid eutectic forms.

36. The method recited in claim 6 wherein:

said composition is single phased throughout the pre-sintering, hot isostatic pressing and resintering steps.

37. The method recited in claim 6 wherein:
the presintering, hot isostatic pressing and resintering steps are all carried out at temperatures at which no liquid eutectic forms.

38. A method of producing a transparent ceramic body comprising:
providing a green compact of appropriate configuration and composition;
presintering said compact at a temperature sufficient to promote grain growth to a substantially closed pore stage;
hot isostatic pressing said presintered compact at a temperature and pressure sufficient to eliminate most pores which are located at grain boundaries; and
resintering said body to induce further grain growth and densification by reducing the number density of pores by a factor of at least 125 and to render said body transparent.

39. A method of making a transparent high density ceramic with low residual porosity comprising:
providing a green ceramic body;
pre-sintering said green ceramic body until the body reaches the closed pore stage, under conditions in which a fine grain structure is produced;
hot isostatic pressing said pre-sintered body for a period of time and at a temperature sufficient to eliminate substantially all pores disposed at grain boundaries; and
resintering said hot isostatically pressed body at a temperature at which further densification and grain growth take place under conditions in which grain boundary migration is slow enough to permit pore disappearance for substantially all pores past which a grain boundary migrates to thereby render said body transparent.

* * * * *